Oct. 30, 1928. 1,690,064

W. HAYES

ANTIREARING ATTACHMENT FOR TRACTORS

Filed Dec. 18, 1926

Inventor
W. Hayes

By Watson E. Coleman
Attorney

Patented Oct. 30, 1928.

1,690,064

UNITED STATES PATENT OFFICE.

WILLIAM HAYES, OF BIG HILL, KENTUCKY.

ANTIREARING ATTACHMENT FOR TRACTORS.

Application filed December 18, 1926. Serial No. 155,738.

This invention relates to anti-rearing attachments for tractors.

An important object of the invention is to provide a simple and readily applied attachment for a tractor which serves not only to prevent rearing of a tractor, but likewise as a hitch for connecting an implement which is to be drawn by the tractor which will permit a limited angular deviation between the tractor and implement without causing an operation of the anti-rearing mechanism.

A further and more specific object of the invention is to provide a pivoted hitch connection for use with tractors, the deflection of which in a predetermined direction for a predetermined degree will cause a disengagement of the stationary and movable elements of the clutch of the tractor, thus permitting the tractor to return to its normal level position.

A further object of the invention is to provide a device of this character in which the operation of the clutch will not be affected during movement of the tractor over rough surfaces, unless the tractor rears.

These and other objects I attain by the construction shown in the accompanying drawings, wherein for the purpose of illustration is shown a preferred embodiment of my invention and wherein:—

Figure 1:
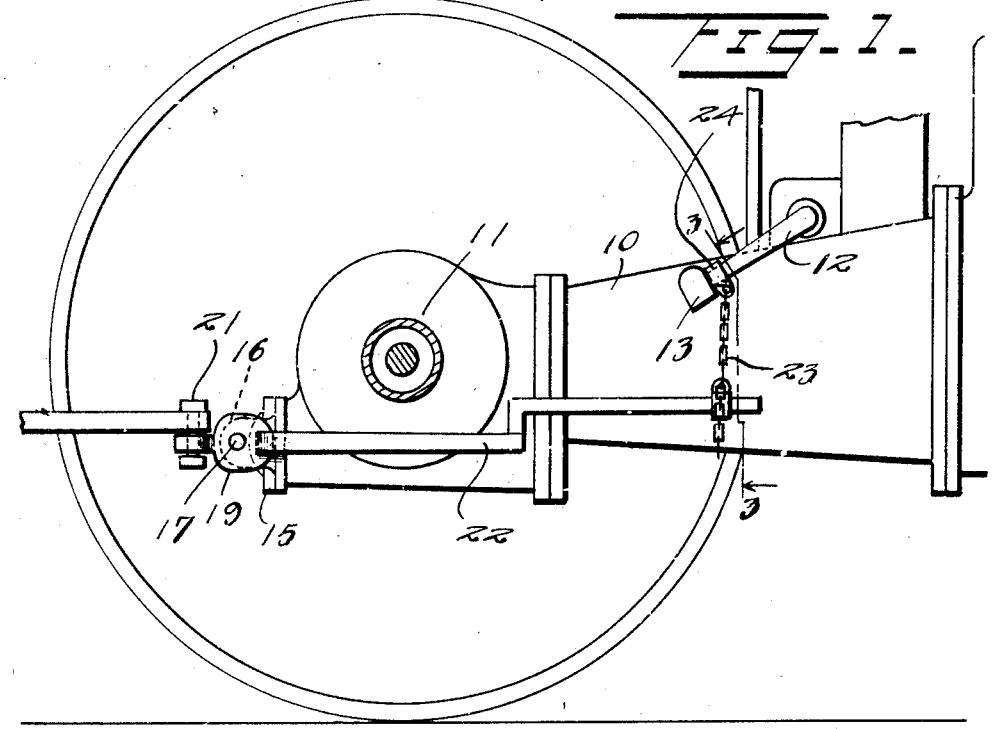
Figure 1 is a side elevation partially in section of a tractor showing an anti-rearing attachment constructed in accordance with my invention applied thereto.
Figure 2:
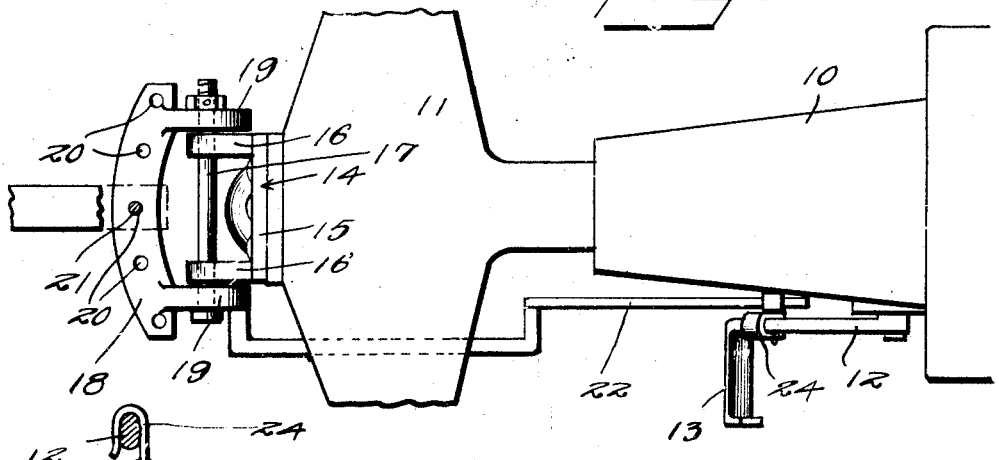
Figure 2 is a fragmentary plan view of the tractor with the attachment.
Figure 3:
Figure 3 is a section on the line 3—3 of Figure 1.

Referring now more particularly to the drawings, the numeral 10 generally designates the rear part of a tractor and 11 the transmission housing thereof from the side of which projects a pivoted lever 12, the terminal of which is provided with a portion 13 for engagement by the foot of the operator. The arm forming the lever 12 is spaced from the side face of the transmission housing 11. Tractors of the type described are usually provided at the rear face of the rear axle housing and at a point generally below the level of the rear axle with a draw-bar connection, generally designated at 14.

In accordance with my invention, this draw-bar connection comprises a plate 15 engaging and secured to the tractor and provided with rearwardly directed ears 16 through which is passed a transversely extending pivot bolt 17. A clevis plate 18 is provided with forwardly directed ears 19 which are apertured for passage of the bolt 17. This clevis plate has transversely spaced openings 20 through which a pin 21 may be directed to connect the draw-bar to the tractor.

The forward end of the ear 19 arranged at the same side of the tractor as the clutch lever 12 is provided with an offset forwardly directed arm 22, the forward end of which swings in a vertical plane lying between the clutch lever 12 and the adjacent face of the transmission housing 11. To the forward end of this arm is secured the lower end of a chain 23 which is adjustable as to length and has at its upper end a clip 24, which is suitably secured to the clutch lever adjacent the free end thereof.

It will be obvious that if the forward end of the tractor elevates, the result will be that the clutch lever 13 will move downwardly with relation to the transmission housing due to the fact that the load connections to the clevis plate 18 will cause the same to remain stationary. The sections of the clutch will, therefore, be disengaged to permit the tractor to return to its normal position. A certain amount of slack is left in the chain 23 in making the connections, so that this chain will not cause an operation of the clutch lever, if the wheels of the tractor simply drop into a small depression or the tractor suddenly starts to ascend an incline. This is possible, due to the fact that the forward end of the arm 22 will be well spaced below the clutch lever and to the fact that this arm has a considerable movement thereof with relation to the clutch lever when there is any relative movement of the tractor and the drawn implement in a vertical plane. It is pointed out that when the clutch is disengaged, the tractor may return to the ground and the engine is speeded up. Since the clutch may return to its engaged position, as the forward end of the tractor returns to the ground, the result is that a jerk will be applied to the load which will have considerable force and will very possibly serve to disengage this load from the obstruction which caused the rearing of the tractor. In the construction of the arm 22, this arm slightly in advance of the axle is offset inwardly and then upwardly, so that its forward end will lie close against the side of the transmission housing and at a level above the bottom of the tractor and be thereby freed from the possibility of contact with brush or any other obstruction which might become entangled in the chain and cause a disengagement of the clutch.

Since the construction hereinbefore set forth is capable of a certain range of change and modification without materially departing from the spirit of the invention, I do not limit myself to such specific structure except as hereinafter claimed.

I claim:—

1. A tractor hitch comprising a plate adapted to be applied to the housing of the rear axle of the tractor at a point below the axle, said plate having spaced ears, a clevis plate having spaced ears lying against the outer surfaces of the first mentioned ears, a pivot bolt passing through all of the ears and bridging the space between them, an arm fixed to one of the ears of the clevis plate and disposed transversely under the housing and flexible means loosely connecting the free end of said arm with the clutch lever of the tractor and permitting limited angular movement of the clevis plate and tractor without actuation of the clutch lever to thereby compensate for angular displacement during passage of the tractor over rough surfaces.

2. A tractor hitch comprising a plate adapted to be applied to the housing of the rear axle of the tractor at a point below the axle, said plate having spaced ears, a clevis plate having spaced ears lying against the outer surfaces of the first mentioned ears, a pivot bolt passing through all of the ears and bridging the space between them, an arm fixed to one of the ears of the clevis plate, said arm having a rear portion offset laterally and disposed transversely under the housing, the forward portion of the arm being disposed approximately in horizontal alinement with that ear of the clevis plate upon which the arm is mounted and flexible means loosely connecting the forward portion of the arm with the clutch lever of the tractor and permitting limited movement of the arm with relation to the clutch lever to thereby prevent actuation of the clutch lever by misalinement of the clevis plate and tractor during passage of the tractor over rough ground.

In testimony whereof I hereunto affix my signature.

WILLIAM HAYES.